（12）United States Patent
Li

(10) Patent No.: US 10,375,775 B1
(45) Date of Patent: Aug. 6, 2019

(54) CIRCUIT AND METHOD FOR LINEAR CONSTANT CURRENT CONTROL AND LED DEVICE

(71) Applicant: SHENZHEN SUNMOON MICROELECTRONICS CO., LTD., Shenzhen, Guangdong (CN)

(72) Inventor: Zhaohua Li, Guangdong (CN)

(73) Assignee: SHENZHEN SUNMOON MICROELECTRONICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/110,403

(22) Filed: Aug. 23, 2018

(30) Foreign Application Priority Data

Jul. 11, 2018 (CN) .......................... 2018 1 0755449
Jul. 11, 2018 (CN) ...................... 2018 2 1097715 U

(51) Int. Cl.
*H05B 33/08* (2006.01)

(52) U.S. Cl.
CPC ..... *H05B 33/0812* (2013.01); *H05B 33/0887* (2013.01)

(58) Field of Classification Search
CPC .................. H05B 33/0812; H05B 33/0887
USPC ..................................................... 315/200 R
See application file for complete search history.

(56) References Cited

U.S. PATENT DOCUMENTS

| | | | | |
|---|---|---|---|---|
| 2012/0212258 A1* | 8/2012 | Choi | ................. | H02M 3/33523 327/75 |
| 2012/0262084 A1* | 10/2012 | Liu | ..................... | H05B 33/0815 315/250 |
| 2013/0106298 A1* | 5/2013 | Datta | ................. | H05B 33/0815 315/186 |
| 2014/0333228 A1* | 11/2014 | Angeles | ............. | H05B 33/0815 315/291 |
| 2015/0137704 A1* | 5/2015 | Angeles | ............. | H05B 33/0815 315/297 |
| 2016/0066386 A1* | 3/2016 | Catalano | ............ | H05B 33/0854 315/309 |
| 2016/0135257 A1* | 5/2016 | Gaknoki | ................ | H05B 33/08 315/309 |

\* cited by examiner

*Primary Examiner* — Don P Le
(74) *Attorney, Agent, or Firm* — Hamre, Schumann, Mueller & Larson, P.C.

(57) ABSTRACT

A circuit and method for linear constant current control for an LED lamp, and an LED device are provided. The power compensation for the input linear power network is performed. When the triac dimmer is connected into the AC linear power network, constant current bleed-off is performed on the current passing through. In the meanwhile, when the triac dimmer detection module detects that a dimmer is connected in, the corresponding bleeder current is switched off, thereby improving the efficiency of the system. In this way, the input power of the system remains basically unchanged as the input voltage changes, besides, the constant current output drives the LED lamp, such that it is solved the problem that in the existing LED lighting and driving technique, the brightness of the entire LED lamp would change in case of voltage fluctuation of the linear power network.

10 Claims, 3 Drawing Sheets

CIRCUIT AND METHOD FOR LINEAR CONSTANT CURRENT CONTROL AND LED DEVICE

CROSS-REFERENCE TO RELATED APPLICATIONS

Pursuant to 35 U.S.C. § 119 and the Paris Convention Treaty, this application claims the benefit of Chinese Patent Application No. 201810755449.7 filed Jul. 26, 2018 and Chinese Patent Application No. 201821097715.3 filed Jul. 26, 2018, the contents of which are incorporated herein by reference.

TECHNICAL FIELD

The invention relates to the technical field of electronic circuits, and more particularly to a circuit and a method for linear constant current control, and an LED device.

BACKGROUND

In recent years, with the development of LED lighting technology, various driving technologies appear. However, with the continuous expansion of the application field, driving requirements become more and more serious, for example, on the dimension, the conversion efficiency, and other requirements, and which are subject to corresponding constraints. However, the existing LED lighting technique has a problem that the brightness of the entire LED lamp would change, in case of voltage fluctuation of the linear power network, resulting in poor environmental lightening effect.

SUMMARY

It is an object of the present application to provide a circuit and a method for linear constant current control circuit, and an LED device, which aims at solving the problem in the existing LED lighting and driving technique that the brightness of the entire LED lamp would change in case of voltage fluctuation of the linear power network, resulting in poor environmental lightening effect.

In accordance with a first aspect of the present application, it is provided a circuit for linear constant current control for an LED lamp, the circuit comprising:
  a linear network compensation module configured for power compensation for an input linear power network;
  a triac dimmer detection module configured to detect whether a triac dimmer is connected in;
  a reference module in connection with the linear network compensation module and configured to generate a reference voltage value;
  an over-temperature protection module in connection with the reference module and configured to reduce the reference voltage value when it is detected that a temperature reaches a preset value;
  a bleeder module in connection with the triac dimmer detection module and the reference module and configured to perform constant current bleed-off on the current passing therethrough when the triac dimmer is connected in; and
  a constant-current driver module in connection with the reference module and configured to regulate the constant current to drive the LED lamp.

In accordance with a second aspect of the present application, it is provided an LED device, comprising an AC power supply and a rectifier module configured to convert an AC signal output from the AC power supply into a DC signal to drive the LED device, wherein the LED device further comprises the above-described circuit for linear constant current control.

In accordance with a third aspect of the present application, it is provided a method for linear constant current control for an LED lamp, the method comprising:
  performing power compensation for an input linear power network;
  reducing a generated reference voltage value when it is detected that a temperature reaches a preset value;
  performing constant current bleed-off on a current passing through when it is detected that a triac dimmer is connected in a circuit for linear constant current control; and
  regulating the constant current to drive the LED lamp.

In the circuit and method for linear constant current control and the LED device provided by the present application, the power compensation for the input linear power network is achieved. When the triac dimmer is connected into the AC linear power network, constant current bleed-off is performed on the current passing through. In the meanwhile, when the triac dimmer detection module detects that a dimmer is connected in, the corresponding bleeder current is switched off, thereby improving the efficiency of the system. In this way, the input power of the system remains basically unchanged as the input voltage changes, besides, the constant current output drives the LED lamp, such that it is solved the problem that in the existing LED lighting and driving technique, the brightness of the entire LED lamp would change in case of voltage fluctuation of the linear power network, which may result in poor environmental lightening effect.

BRIEF DESCRIPTION OF THE DRAWINGS

FIG. 4 is a schematic diagram of an operating current waveform of the circuit for linear constant current control for the LED lamp provided by the present application where a triac dimmer is not connected in.

FIG. 5 is a schematic diagram of an operating current waveform of the circuit for linear constant current control for the LED lamp provided by the present application where a triac dimmer is connected in.

DETAILED DESCRIPTION OF THE DRAWINGS

The present application will be further described in detail hereinbelow with reference to the accompanying drawings and embodiments. It should be understood that the specific embodiments described herein are merely illustrative and are not intended to limit the present application.

The above-mentioned circuit for linear constant current control for an LED lamp, method and LED device adopt constant current and constant power control technology, by detecting the voltage at an VT port and controlling an output current, the input power can basically remain constant when the input voltage changes. In the meanwhile, by detecting the voltage at a TRIAC port and controlling a bleeder current, the TRIAC port can be switched off when no triac dimmer is connected into the system, and the TRIAC port can be normally switched on when the triace dimmer is connected into the system. The circuit for the linear constant current control also has the over-temperature regulation function, when the temperature is too high, the output current is reduced, and the application reliability of the system is therefore improved. The means provided by the present application for compensating the voltage of the linear power network can solve the problems of the existing LED lighting drive technology.

Figure 1:
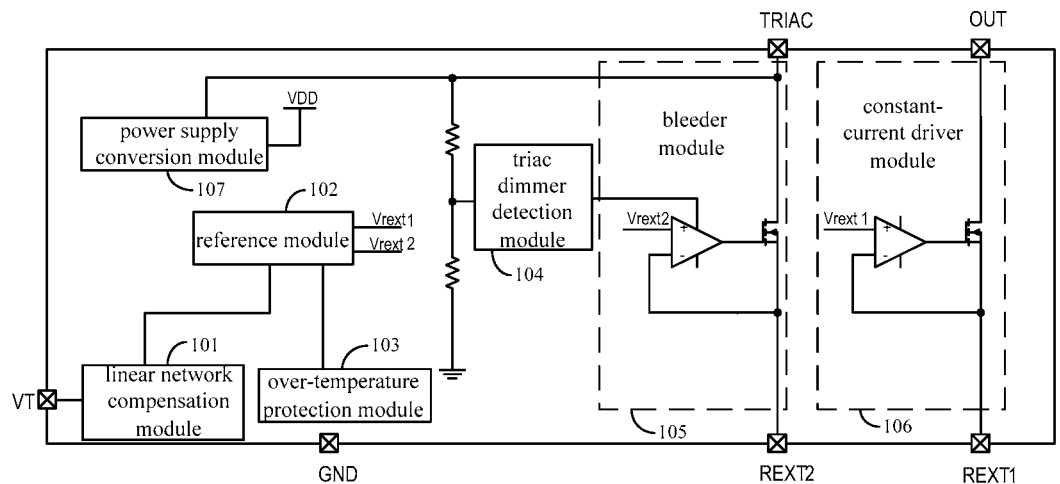
FIG. 1 is a schematic diagram showing a modular structure of a circuit for linear constant current control for an LED lamp provided by the present application.

FIG. 1 illustrates a modular structure of the circuit for linear constant current control for an LED lamp provided by the present application. For facilitating the description, only those parts related to this embodiment are shown and introduced in detail as follows:

A circuit for linear constant current control for an LED lamp is provided. The circuit for linear constant current control comprises: a linear network compensation module 101, a triac dimmer detection module 104, a reference module 102, an over-temperature protection module 103, a bleeder module 105, and a constant-current driver module 106.

The linear network compensation module 101 is configured for power compensation for an input linear power network.

The triac dimmer detection module 104 is configured to detect whether a triac dimmer is connected in.

The reference module 104 is in connection with the linear network compensation module 101 and configured to generate a reference voltage value.

The over-temperature protection module 103 is in connection with the reference module 102 and configured to reduce the reference voltage value when it is detected that a temperature reaches a preset value.

The bleeder module 105 is in connection with the triac dimmer detection module 104 and the reference module 102 and configured to perform constant current bleed-off on the current passing therethrough when the triac dimmer is connected in.

The constant-current driver module 106 is in connection with the reference module 102 and configured to regulate the current passing therethorugh to realize constant current output.

As an embodiment of the present application, the circuit for linear constant current control further comprises:

a power conversion module 107 which is in connection with the triac dimmer detection module 104 and the bleeder module 105 and is configured to supply power to the circuit for linear constant current control after voltage conversion of the reference power supply connected in.

Figure 2:
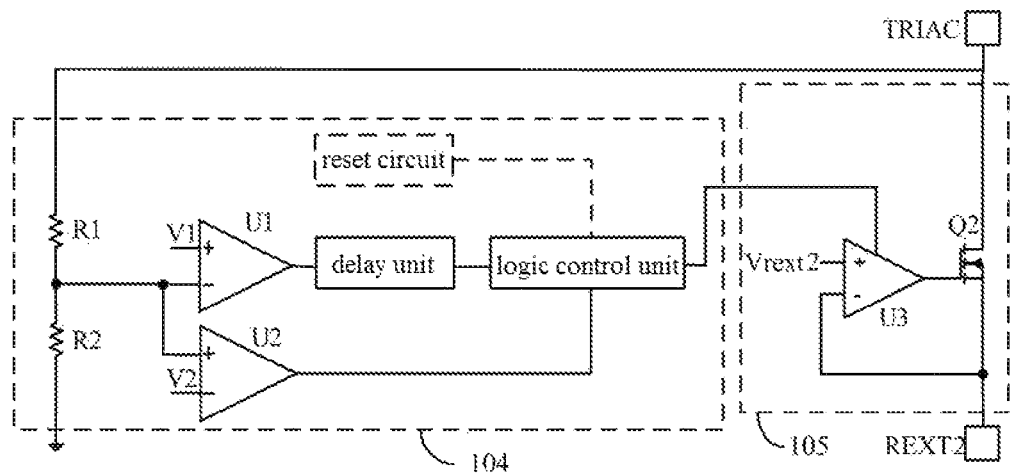
FIG. 2 is an exemplary circuit diagram of a triac dimmer detection module and a bleeder module in the circuit for linear constant current control for the LED lamp provided by the present application.

FIG. 2 is an exemplary circuit diagram of the triac detection module and the bleeder module in the circuit for linear constant current control for the LED lamp provided by the present application. For facilitating the description, only those part related to this embodiment are shown and described in detail as follows:

As an embodiment of the present application, the triac dimmer detection module 104 comprises: a first resistor R1, a second resistor R2, a first comparator U1, a second comparator U2, a delay unit, and a logic control unit; and the triac dimmer detection module 104 may further comprise a reset circuit.

A first terminal of the first resistor R1 acts as an input terminal of the silicon controlled detection module 104; a second terminal of the first resistor R1, a first terminal of the second resistor R2, an inverting input terminal of the first comparator U1, and the non-inverting input terminal of the second comparator U2 are commonly connected; a second terminal of the second resistor R2 is grounded; an output terminal of the first comparator U1 is connected with an input terminal of the delay unit; an output terminal of the delay unit is connected with an input terminal of the logic control unit; an output terminal of the second comparator U2 is connected with a controlled terminal of the logic control unit; an output terminal of the logic control unit acts as an output terminal of the triac dimmer detection module 104; and an output terminal of the reset circuit is connected with the input terminal of the logic control unit.

As an embodiment of the present application, the bleeder module 105 comprises a third comparator U3 and a second switch transistor Q2.

A non-inverting input terminal of the third comparator U3 is connected with the reference module 102, an output terminal of the third comparator U3 is connected with a controlled terminal of the second switch transistor Q2, an input terminal of the second switch transistor Q2 acts as an input terminal of the bleeder module 102, an inverting input terminal of the third comparator U3 and an output terminal of the second switch transistor Q2 are commonly connected and act as an output terminal of the bleeder module 105.

Specifically, the second switch transistor Q2 is a field effect transistor or a triode.

A gate, a drain, and a source of the field effect transistor act as a controlled terminal, an input terminal, and an output terminal of the second switch transistor Q2, respectively.

A base, a collector, and an emitter of the triode act as a controlled terminal, an input terminal, and an output terminal of the second switch transistor Q2.

Figure 3:
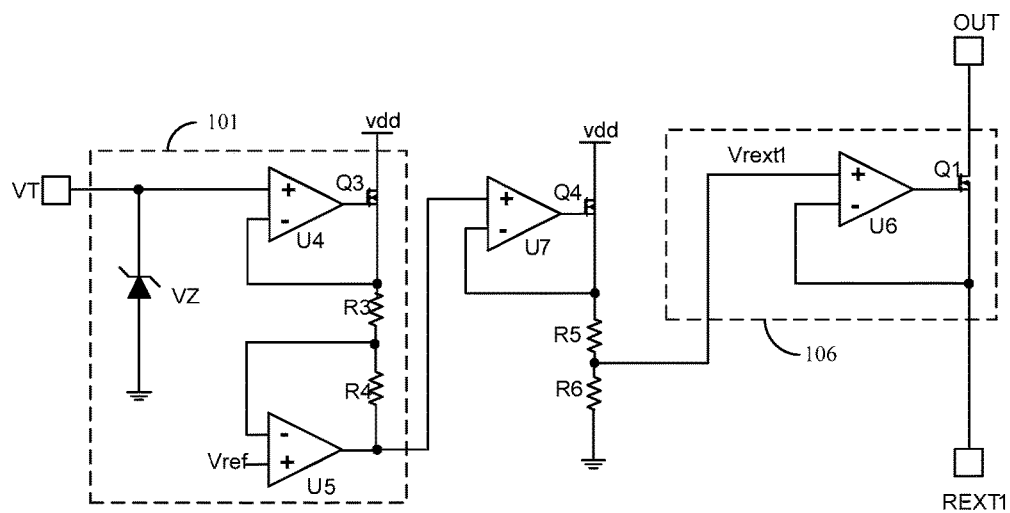
FIG. 3 is an exemplary circuit diagram of a linear network compensation module and a constant-current driver module in the circuit for linear constant current control for the LED lamp provided by the present application.

FIG. 3 shows an exemplary circuit diagram of the linear network compensation module and the constant-current driver module in the circuit for linear constant current control for the LED lamp provided by the present application. For facilitating the description, only those parts related to this embodiment are shown and introduced in detail as follows:

As an embodiment of the present application, the linear network compensation module 101 comprises: a Zener diode, a third resistor R3, a fourth resistor R4, a third resistor Q3, a fourth comparator U4, and a fifth comparator U5.

A cathode of the Zener diode VZ and a non-inverting input terminal of the fourth comparator U4 are commonly connected and act as an input terminal of the linear network compensation module 101; an anode of the Zener diode VZ is grounded; an output terminal of the fourth comparator U4 is connected with a controlled terminal of the third switch transistor Q3; an input terminal of the third switch transistor Q3 is connected with a reference voltage add; an inverting input terminal of the fourth comparator U4, an output terminal of the third switch transistor Q3, and a first terminal of the third resistor R3 are commonly connected; a second terminal of the third resistor R3, a first terminal of the fourth resistor R4, and an inverting input terminal of the fifth comparator U5 are commonly connected; and a second terminal of the fourth resistor R4 is connected with an output terminal of the fifth comparator U5.

Specifically, the third switch transistor Q3 is a field effect transistor or a triode.

A gate, a drain, and a source of the field effect transistor act as a controlled terminal, an input terminal, and an output terminal of the third switch transistor Q3, respectively.

A base, a collector, and an emitter of the triode act as a controlled terminal, an input terminal, and an output terminal of the third switch transistor Q3.

As an embodiment of the present application, the constant-current driver module 106 comprises: a sixth comparator U6 and a first switch transistor Q1.

A non-inverting input terminal of the sixth comparator U6 is connected with the reference module 102; an output terminal of the sixth comparator U6 is connected with a controlled terminal of the first switch transistor Q1; an input terminal of the first switch transistor Q1 acts as an input terminal of the constant-current driver module 106; and an inverting input terminal of the sixth comparator U6 and an output terminal of the first switch transistor Q1 are commonly connected and act as an output terminal of the constant-current driver module 106.

Specifically, the first switch transistor Q1 is a field effect transistor or a triode.

A gate, a drain, and a source of the field effect transistor act as a controlled terminal, an input terminal, and an output terminal of the first switch transistor Q1, respectively.

A base, a collector, and an emitter of the triode act as a controlled terminal, an input terminal, and an output terminal of the first switch transistor Q1.

Working principle of the linear network compensation module and the constant-current driver module in the above circuit for linear constant current control for the LED lamp is described below with reference to FIG. 3 as follows:

The input voltage is detected by the VT port. When the input voltage increases, the input current is decreased. When the input voltage decreases, the input current is increased, such that the system input power does not change along with the fluctuation of the input line voltage.

Figure 4:
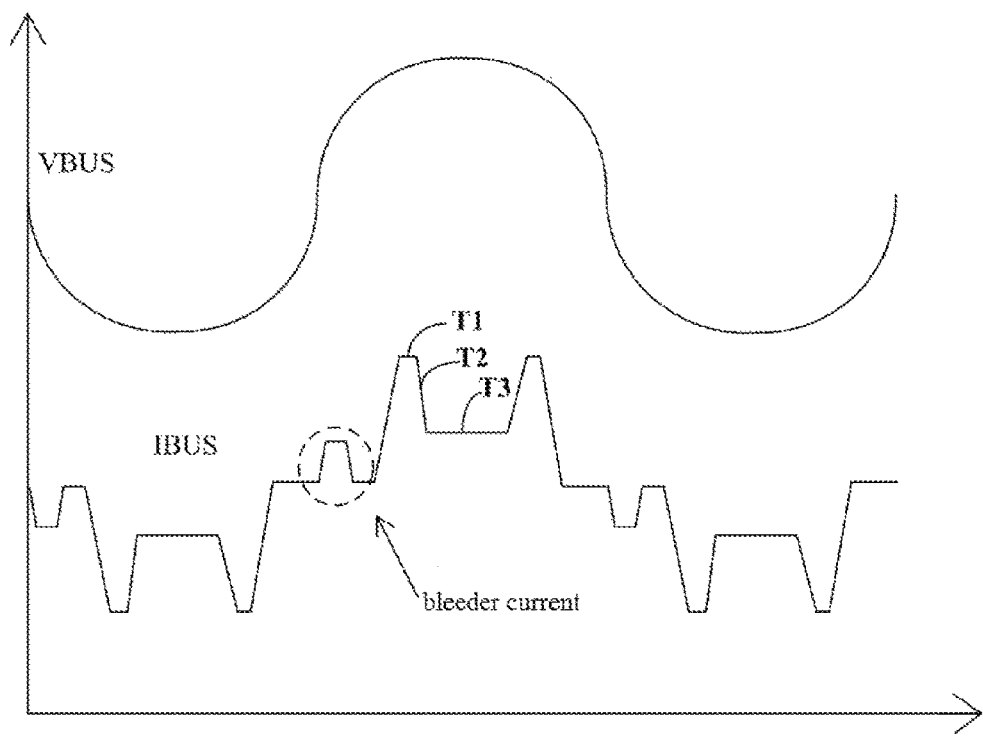

When VT is smaller than Verf, the OUT port is switched on with a constant current (indicated by T1 in FIG. 4); when VT is greater than Verf and smaller than VZ, the current at the OUT port decreases as VT increases (indicated by T2 in FIG. 4); and when VT is greater than VZ, VT is clamped, and the OUT port is switched on with a constant current (indicated by T3 in FIG. 4).

An LED device is further provided by the present application. The LED device comprises: an AC power supply, and a rectifier module configured to convert an AC signal output from the AC power supply into a DC signal to drive the LED device. The LED device further comprises the above-described circuit for linear constant current control.

When the TRIAC port reaches the operating voltage of the linear constant current control circuit, the circuit is started, and the voltage at the TRIAC port is detected to control the bleeder current, when the triac dimmer is not connected into the system, and when the voltage at the TRIAC port voltage is greater than the preset voltage of the linear constant current control circuit, the TRIAC port is switched off. When the triac dimmer is connected into the system, the TRIAC port is normally switched on. By detecting the voltage at the VT port to control the output current of the OUT port, the output current is reduced when the line voltage increases, thereby improving the efficiency; and the input power basically remains unchanged when the input voltage changes. Among them, REXT1 and REXT2 resistors are set to have the currents of the TRIAC port and OUT port respectively.

Figure 5:
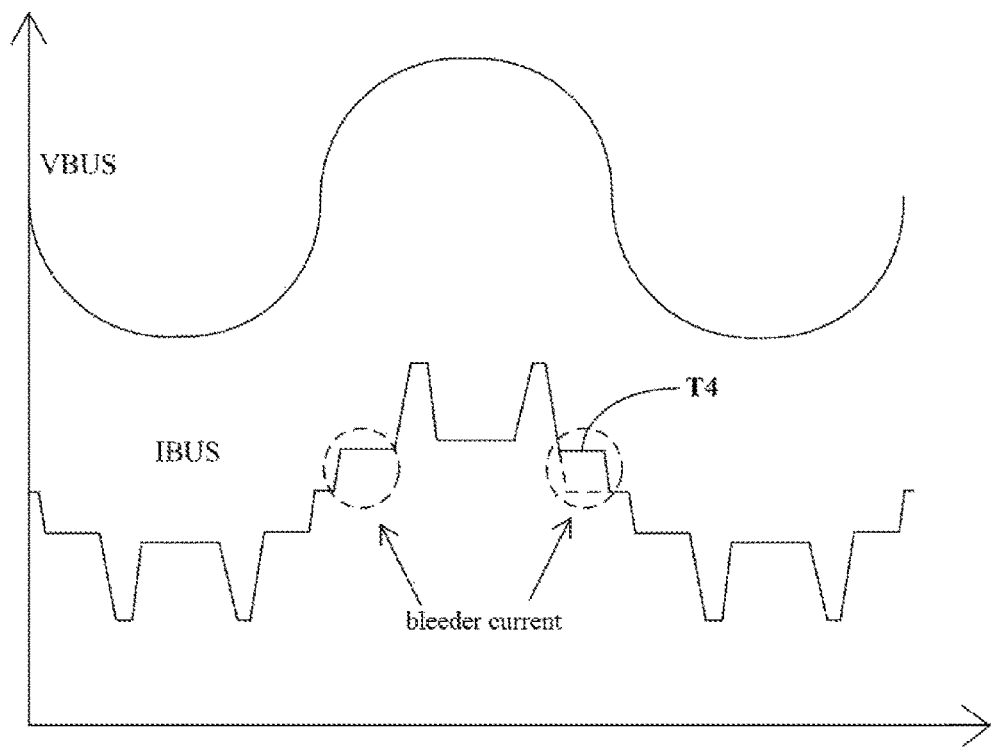

FIG. 4 and FIG. 5 respectively illustrate the operating current waveforms of the circuit for linear constant current control for the LED lamp in case that the triac dimmer is not connected in and in case that the triac dimmer is connected in, and in combination with FIG. 2, working principle of the triac dimmer detection module and the bleeder module of the circuit for linear constant current control of the LED lamp are described as follows:

In case that the triac dimmer is not connected in:

When the $V_{TRIAC}$ partial pressure is smaller than V1, the TRIAC port is switched on and continues to be detected. When the $V_{TRIAC}$ partial pressure is greater than V1 and the $V_{TRIAC}$ partial pressure is detected to be smaller than V2 during the delay time, the TRIAC port is switched off until the end of each wire network cycle.

In case that the triac dimmer is connected in:

Switch-on control: when the $V_{TRIAC}$ partial pressure is smaller than V1, the TRIAC port is switched on and continuously detected. When the $V_{TRIAC}$ partial pressure is greater than V1 and the $V_{TRIAC}$ partial pressure is greater than V2 within the delay time, the $T_{RIAc}$ port is normally switched on until the end of each cycle of the linear power network.

Switch-off control: when the REXT1 port voltage is greater than Vrext2, the third comparator U3 is switched off, the output is low, and the $T_{RIAC}$ port is switched off until the REXT1 port voltage is smaller than Vrext2, and the $T_{RIAc}$ port is switched on again until each cycle of the linear power network is finished and reset.

Or switch-off control: when the REXT1 port voltage is greater than Vrext2, the third comparator U3 is switched off, the output is low, and the $T_{RIAC}$ port is switched off until each cycle of the linear power network is finished and reset.

Figure 6:
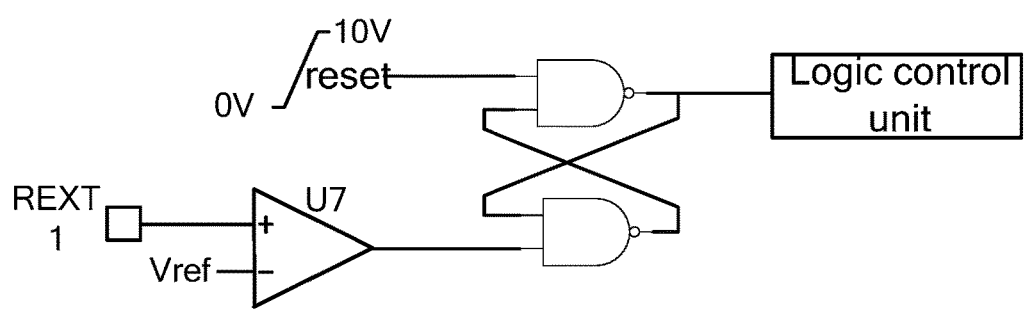
FIG. 6 is an exemplary circuit diagram of a reset circuit in the triac dimmer detection module corresponding to FIG. 2.

FIG. 6 shows an exemplary circuit diagram of a reset circuit in the triac dimmer detection module. For facilitating the description, only those parts related to this embodiment are shown, and are described as follows:

As an embodiment of the present application, the above reset circuit is capable of switching off the bleeder current at the time point T4 in FIG. 5, thereby improving the efficiency of the power supply.

An LED device is further provided by the present application. The LED device comprises: an AC power supply, and a rectifier module configured to convert an AC signal output from the AC power supply into a DC signal to drive the LED device. The LED device further comprises the circuit for linear constant current control as described in the above.

A method for linear constant current control for an LED lamp is also provided by the present application. The method comprises:

A. performing power compensation for an input linear power network;

B. reducing a generated reference voltage value when it is detected that a temperature reaches a preset value;

C. performing constant current bleed-off on a current passing through when it is detected that a triac dimmer is connected in a circuit for linear constant current control; and D. regulating the current passing through to realize constant current output.

As an embodiment of the present application, the above method for linear constant current control further comprises: switching off the circuit for linear constant current control when it is detected that the triac dimmer is not connected in the circuit for linear constant current control.

In summary, in the circuit and method for linear constant current control and the LED device provided by embodiments of the present application, the power compensation for the input linear power network is achieved. When the triac dimmer is connected into the AC linear power network, constant current bleed-off is performed on the current passing through. In the meanwhile, when the silicon controlled detection module detects that a dimmer is connected in, the corresponding bleeder current is switched off, thereby improving the efficiency of the system. In this way, the input power of the system remains basically unchanged as the input voltage changes, besides, the constant current output drives the LED lamp, such that it is solved the problem that in the existing LED lighting and driving technique, the brightness of the entire LED lamp would change in case of voltage fluctuation of the linear power network, which may result in poor environmental lightening effect.

The above embodiments are only the preferred embodiments of the present application, and are not intended to limit the present application. Any modifications, equivalent replacements, and improvements made within the spirit and principles of the present application should be included in the protection scope of the present application.

What is claimed is:

1. A circuit for linear constant current control for an LED lamp, the circuit comprising:
    a linear network compensator configured for power compensation for an input linear power network;
    a triac dimmer detector configured to detect whether a silicon controlled rectifier dimmer is connected in;
    a reference subcircuit in connection with the linear network compensator and configured to generate a reference voltage value;
    an over-temperature protector in connection with the reference subcircuit and configured to reduce the reference voltage value when it is detected that a temperature reaches a preset value;
    a bleeder in connection with the triac dimmer detector and the reference subcircuit and configured to perform constant current bleed-off on the current passing therethrough when the triac dimmer is connected in; and
    a constant-current driver in connection with the reference subcircuit and configured to regulate the current passing therethorugh to realize constant current output.

2. The circuit of claim 1, further comprising: a power convertor in connection with the triac dimmer detector and the bleeder and configured to supply power to the circuit for linear constant current control after voltage conversion of the reference power supply connected in.

3. The circuit of claim 1, wherein the triac dimmer detector comprises:
    a first resistor, a second resistor, a first comparator, a second comparator, a delay unit, and a logic control unit;
    a first terminal of the first resistor acts as an input terminal of the triac dimmer detector;
    a second terminal of the first resistor, a first terminal of the second resistor, an inverting input terminal of the first comparator, and the non-inverting input terminal of the second comparator are commonly connected; a second terminal of the second resistor is grounded; an output terminal of the first comparator is connected with an input terminal of the delay unit; an output terminal of the delay unit is connected with an input terminal of the logic control unit; an output terminal of the second comparator is connected with a controlled terminal of the logic control unit; and an output terminal of the logic control unit acts as an output terminal of the triac dimmer detector.

4. The circuit of claim 1, wherein the bleeder comprises:
    a third comparator and a second switch transistor;
    a non-inverting input terminal of the third comparator is connected with the reference subcircuit, an output terminal of the third comparator is connected with a controlled terminal of the second switch transistor, an input terminal of the second switch transistor acts as an input terminal of the bleeder, an inverting input terminal of the third comparator and an output terminal of the second switch transistor are commonly connected and act as an output terminal of the bleeder.

5. The circuit of claim 1, wherein the linear network compensator comprises:
    a Zener diode, a third resistor, a fourth resistor, a third resistor, a fourth comparator, and a fifth comparator;
    a cathode of the Zener diode and a non-inverting input terminal of the fourth comparator are commonly connected and act as an input terminal of the linear network compensator; an anode of the Zener diode is grounded; an output terminal of the fourth comparator is connected with a controlled terminal of the third switch transistor; an inverting input terminal of the fourth comparator, an output terminal of the third switch transistor, and a first terminal of the third resistor are commonly connected; a second terminal of the third resistor, a first terminal of the fourth resistor, and an inverting input terminal of the fifth comparator are commonly connected; and a second terminal of the fourth resistor is connected with an output terminal of the fifth comparator.

6. The circuit of claim 1, wherein the constant-current driver module comprises:
    a sixth comparator and a first switch transistor;
    a non-inverting input terminal of the sixth comparator is connected with the reference subcircuit; an output terminal of the sixth comparator is connected with a controlled terminal of the first switch transistor; an input terminal of the first switch transistor acts as an input terminal of the constant-current driver; and an inverting input terminal of the sixth comparator and an output terminal of the first switch transistor are commonly connected and act as an output terminal of the constant-current driver.

7. The circuit of claim 6, wherein the first switch transistor is a field effect transistor or a triode;
    a gate, a drain, and a source of the field effect transistor act as a controlled terminal, an input terminal, and an output terminal of the first switch transistor, respectively; and
    a base, a collector, and an emitter of the triode act as a controlled terminal, an input terminal, and an output terminal of the first switch transistor.

8. An LED device, comprising an alternating current (AC) power supply and a rectifier module configured to convert an AC signal output from the AC power supply into a DC signal to drive the LED device, wherein the LED device further comprises the circuit for linear constant current control of claim 1.

9. A method for linear constant current control for an LED lamp that comprises the circuit of claim 1 for linear constant current control, the method comprising:
    performing, by the linear network compensator, power compensation for the input linear power network;
    reducing, by the over-temperature protector, a generated reference voltage value when it is detected that the temperature reaches the preset value;

performing, by the bleeder, constant current bleed-off on the current passing through when the triac dimmer detector detects that the silicon controlled rectifier dimmer is connected in the circuit for linear constant current control; and regulating, by the constant-current driver, the current passing through to realize constant current output.

10. The method of claim 9, further comprising:

switching off the circuit for linear constant current control when it is detected that the triac dimmer is not connected in the circuit for linear constant current control.

\* \* \* \* \*